July 17, 1951          A. VAN HULZEN          2,560,609
TIRE TUBE
Filed Dec. 18, 1946          2 Sheets-Sheet 1
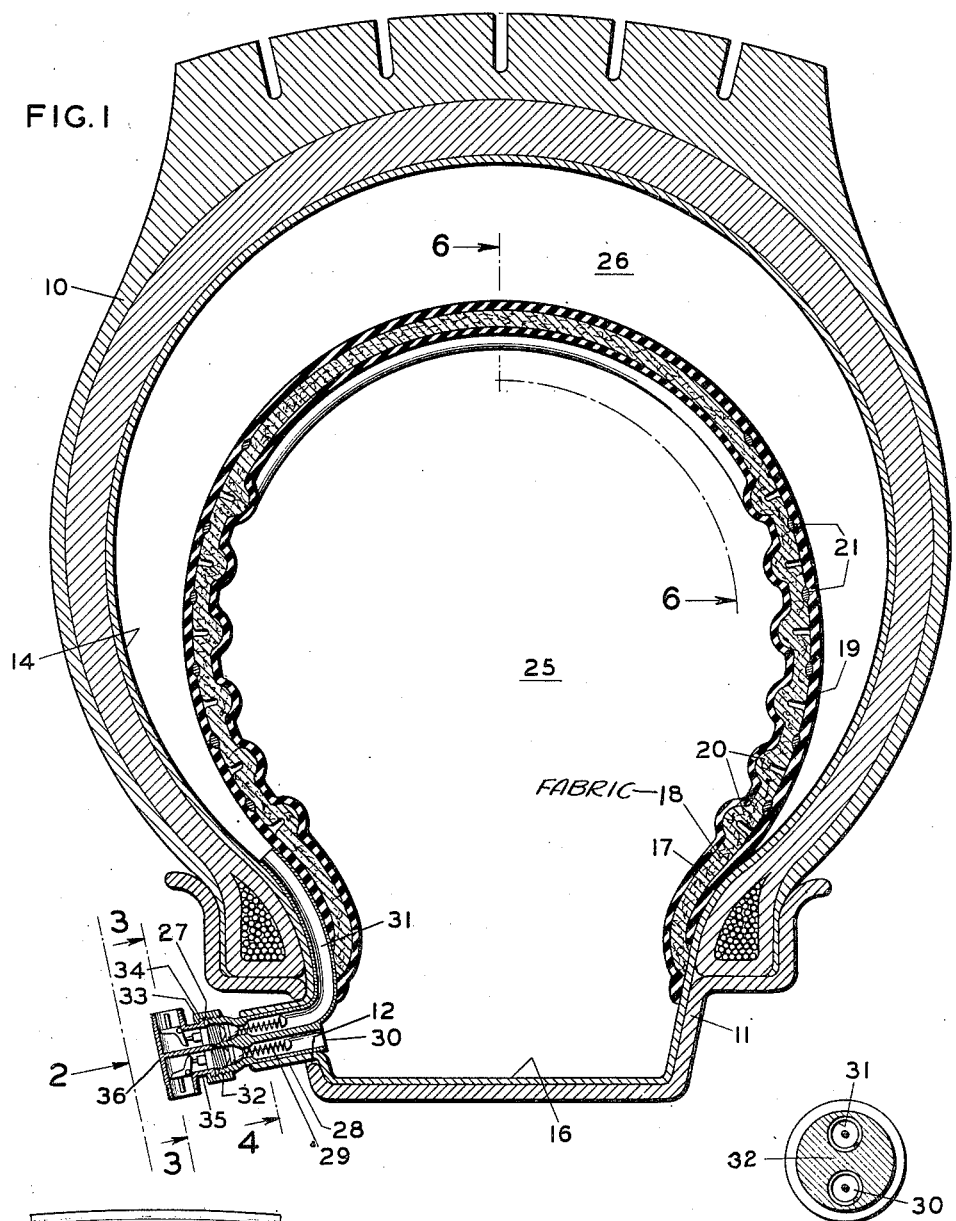
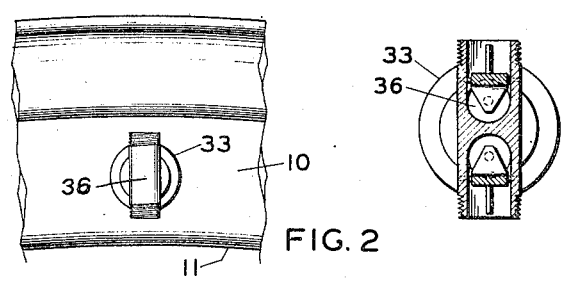
INVENTOR:
ANDREW VAN HULZEN
BY
ATTORNEYS.

July 17, 1951  A. VAN HULZEN  2,560,609
TIRE TUBE

Filed Dec. 18, 1946  2 Sheets-Sheet 2

INVENTOR:
ANDREW VAN HULZEN
BY Milo B. Stevens & Co.

ATTORNEYS.

Patented July 17, 1951

2,560,609

UNITED STATES PATENT OFFICE 2,560,609

TIRE TUBE

Andrew Van Hulzen, Chicago, Ill.

Application December 18, 1946, Serial No. 716,972

3 Claims. (Cl. 152—339)

My invention relates to tubes for automobile tires, and more particularly to the type designed to reduce the danger of accidents in case the tire suffers a blow-out.

It is one object of the invention to provide a tube which is built into the regular inner tube of the tire, and has facilities for expanding to fill the tire in case the inner tube has become punctured or torn from the effects of the blow-out.

A further object is to design an internal tube which has a strong wall with a formation designed to expand to full inner tube size and keep the tire up and in running condition until a service station is reached.

Another object is to provide a tube which eliminates the possibility of a flat tire from any cause, making it unnecessary to jack up the car or change the tire while on the road.

Another object is to construct the novel tube along lines of ruggedness and simplicity.

With the above objects in view, and any others which may suggest themselves from the description to follow, a better understanding of the invention may be had by reference to the accompanying drawings, in which:

Fig. 1 is a cross-section of the tire equipped with the novel tube;

Fig. 2 is a view of the tire valve from the arrow 2 of Fig. 1;

Figure 5:
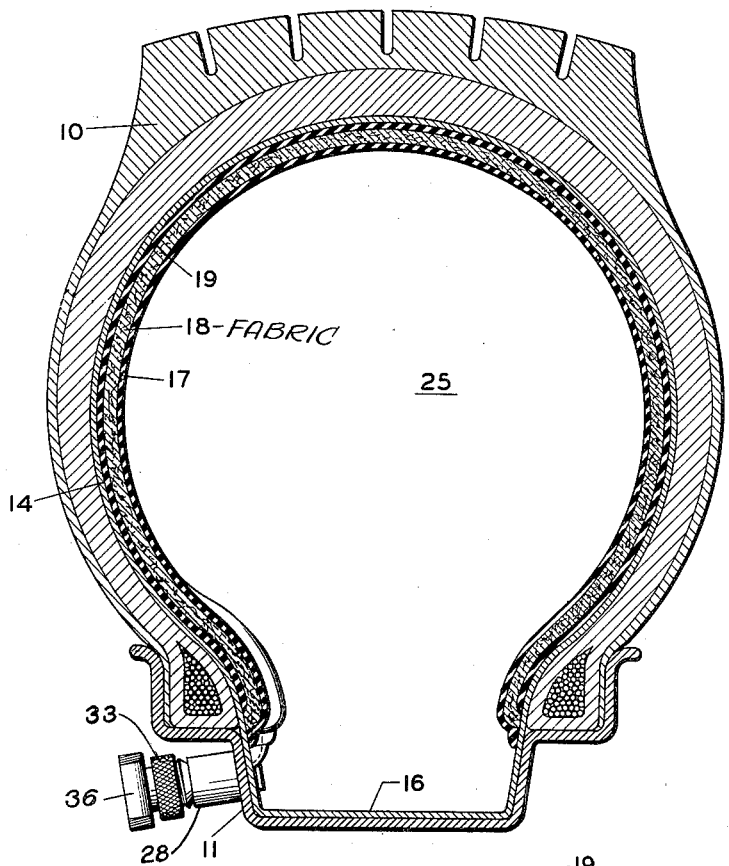
Figure 6:
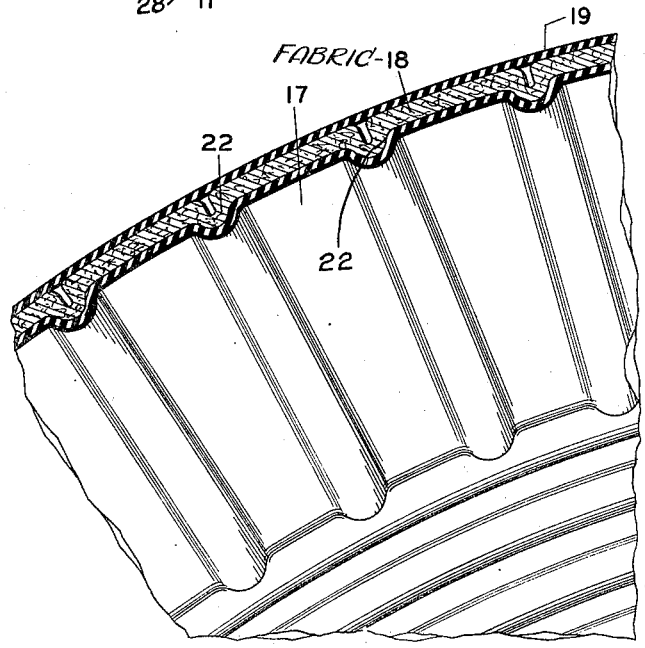

Figs. 3 and 4 are, respectively, sections on the lines 3—3 and 4—4 of Fig. 1;

Fig. 5 is a view similar to Fig. 1, showing the position of the novel tube when expanded; and Fig. 6 is a section on the line 6—6 of Fig. 1.

In accordance with the foregoing, specific reference to the drawings indicates the casing of a typical automobile tire at 10. The casing is shown mounted on a rim 11 which is made with a side opening 12 for the passage of the tire valve. The casing receives a conventional inner tube 14.

The improvement deals with an internal tube similar to the inner tube 14, but open on the inner side to communicate with the inner portion 16 of the inner tube. The internal tube is composed of three plies 17, 18 and 19, these being joined with their inner edges to the portion 16 of the inner tube 14.

The ply 17 is of regular inner tube material; and the ply 19 is of similar material, but has a greater gum content for increased elasticity. However, the medial ply 18 is of sturdy fabric and formed with a number of folds 20 extending in parallelism in a circumferential course. Ribbons 21 of adhesive material are secured between the ply 18 and 19 at points midway between the folds or corrugations 20. The ply 18 also has a series of transverse corrugations 22.

It is understood that the air pressure in the chamber 25 within the internal tube 18 would have to be kept the same as that in the chamber 26 between the internal tube and the inner tube 14 in order not to deform the internal tube in any respect. However, should a blow-out or other tire injury occur which would puncture or rupture the inner tube 14, the first effect would be the escape of air from the outer space 26. In such event, the pressure in the chamber 25 would bear on the internal tube to expand the same. This action would be made possible by the separation and straightening out of the folds 20 and 22 of the fabric ply 18 while the rubber plies 17 and 19 expand by elasticity. Thus, by properly constructing, spacing and dimensioning the folds of the internal tube, it may be calculated to fully fit or line the inner tube 14 when expanded. Since the internal tube is of a sturdy construction, it will bridge the punctured or ruptured zone of the tire without giving way, since the pressure in the internal tube will have fallen because of its increased volume. The tire will thus be in a position to continue its travel, as it will have sufficient pressure for temporary travel until a repair station is reached. The fact that the tire does not become flat in case of a blow-out or puncture saves the task of changing it on the road; also, it prevents an accident from loss of control.

A prerequisite of the improved internal tube is that the chambers 25 and 26 must be separately inflated. Any suitable means may be used for this purpose, and one example is illustrated. Figs. 3 and 4 show that the inner tube 14 is formed with a neck 28 which is extended out of the tire through the rim opening 12. The neck 28 is chambered to accommodate a pair of inflation valves 27 side by side, tubes 30 and 31 connecting these with the chambers 25 and 26 respectively. The valve housing 32 is preferably threaded to receive a nut 33 engageable with the annular flange 34 of a filler unit 35. The latter has a T-head 36 permitting the application of the usual inflating-hose nipple at both ends to separately fill the chambers 25 and 26. The filler unit 35 may be set non-rotably in relation to the valve housing 32 by any suitable locking means. Thus, suitable amounts of air pressure may be prescribed for the tire valves for the proper inflation of the chambers 25 to 26. However, when the tire is to be removed from the rim, the retraction of the valve housing is made possible when the retaining nut 33 and the inflation unit 35 are removed.

It will now be apparent that the novel internal tube is a unit which forms a safeguard against a flat tire in case of the failure of the casing or the regular inner tube. Thus, the necessity of a roadside change is eliminated, enabling the driver to proceed on his way, while the damaged tire is capable of running at a reduced pressure until the service station is reached. The possibility of an accident and the inconvenience of jacking up the car and making a tire change on the road are therefore eliminated.

While I have described the invention along specific lines, various minor changes or refinements may be made therein without departing from its principle, and I reserve the right to employ all such changes and refinements as may come within the scope and spirit of the appended claims.

I claim:

1. A tire unit comprising a conventional inner tube, an elastic internal tube with its inner portion opening on the rim portion of the inner tube, such internal tube being spaced with its crown and sides from the tread portion and sides of the inner tube, means for separately inflating the inner tube and the internal tube, and other means carried by the internal tube and maintained in a folded state when the pressure in both tubes is substantially equal, said other means becoming extended to fill the tire in the event the inner tube loses its pressure from a major tire failure, said other means comprising a ply of heavy fabric formed with folds at the sides extending in a circumferential course, and with folds in the crown extending transversely of the first-named folds.

2. A tire unit comprising a conventional inner tube, an internal tube attached thereto along the inner periphery thereof, means for separately inflating the inner tube and the internal tube, said internal tube formed of inner and outer wall plies of elastic material, and a medial ply of material normally arranged in folds extending in a circumferential course, and said medial ply provided with a series of transverse corrugations.

3. A tire unit comprising a conventional inner tube, an internal tube attached thereto along the inner periphery thereof, means for separately inflating the inner tube and the internal tube, said internal tube formed of inner and outer wall plies of elastic material, and a medial ply of material normally arranged in folds extending in a circumferential course, said folds extending inwardly of the internal tube and having flat base portions and ribbons of adhesive material secured between the outer and medial plies at the respective base portions of the folds.

ANDREW VAN HULZEN.

REFERENCES CITED

The following references are of record in the file of this patent:

UNITED STATES PATENTS

| Number | Name | Date |
|---|---|---|
| 516,669 | Washburn | Mar. 20, 1894 |
| 616,516 | Wilson | Dec. 27, 1898 |
| 2,004,892 | Grieshaber | June 11, 1935 |
| 2,334,893 | Arey | Nov. 23, 1943 |

FOREIGN PATENTS

| Number | Country | Date |
|---|---|---|
| 113,611 | Australia | Oct. 29, 1940 |